United States Patent
Santan et al.

(10) Patent No.: US 10,191,305 B2
(45) Date of Patent: Jan. 29, 2019

(54) OPHTHALMIC LENS

(71) Applicant: Signet Armorlite, Inc., Carlsbad, CA (US)

(72) Inventors: Prashant Santan, San Diego, CA (US); Newton M. Tarleton, Vista, CA (US)

(73) Assignee: Signet Armorlite, Inc., Carlsbad, CA (US)

( * ) Notice: Subject to any disclaimer, the term of this patent is extended or adjusted under 35 U.S.C. 154(b) by 37 days.

(21) Appl. No.: 14/985,011

(22) Filed: Dec. 30, 2015

(65) Prior Publication Data
US 2017/0192255 A1    Jul. 6, 2017

(51) Int. Cl.
| G02C 7/10 | (2006.01) |
| G02B 1/11 | (2015.01) |
| G02B 1/10 | (2015.01) |
| G02B 5/28 | (2006.01) |

(52) U.S. Cl.
CPC ............. *G02C 7/107* (2013.01); *G02B 1/10* (2013.01); *G02B 1/11* (2013.01); *G02B 5/283* (2013.01); *G02C 7/10* (2013.01); *G02C 7/104* (2013.01); *G02C 7/105* (2013.01); *G02C 7/108* (2013.01); *G02C 2202/16* (2013.01)

(58) Field of Classification Search
CPC .......... G02C 7/10; G02C 7/101; G02C 7/102; G02C 7/104; G02C 7/107; G02C 7/12; G02C 7/105; G02C 7/108; G02C 2202/16; G02B 1/11
USPC .......... 359/580, 581, 586, 588, 590; 351/159.01, 159.62–159.67, 159.7, 351/159.73–159.77
See application file for complete search history.

(56) References Cited

U.S. PATENT DOCUMENTS

| 4,793,669 A * | 12/1988 | Perilloux .............. G02B 5/282 359/355 |
| 4,878,748 A | 11/1989 | Johansen et al. |
| 4,911,546 A | 3/1990 | Cohen |
| 4,929,250 A | 5/1990 | Hung et al. |
| RE33,729 E | 10/1991 | Perilloux |
| 5,177,509 A | 1/1993 | Johansen et al. |
| 5,332,618 A * | 7/1994 | Austin ................... G02B 1/115 359/359 |

(Continued)

FOREIGN PATENT DOCUMENTS

| WO | 1988002871 | 4/1998 |
| WO | 2015000534 | 1/2015 |

OTHER PUBLICATIONS

Mazur et al.,TiO2/SiO2 multilayer as an antireflective and protective coating deposited by microwave assisted magnetron sputtering, Opto-Electronics Review , vol. 21 (2), pp. 233-238, 2013.

(Continued)

*Primary Examiner* — Stephone B Allen
*Assistant Examiner* — Travis Fissel
(74) *Attorney, Agent, or Firm* — Ice Miller LLP

(57) ABSTRACT

A thin film coating for an ophthalmic lens is provided, that comprises alternating layers of high and low index materials. The coating attenuates the transmission of light and has a spectral reflectance curve characterized by a reflectance of at least about 90% in a range from 320 nm to 420 nm, by 50% at 440 nm, by 5% or less at 460 nm, and wherein the spectral reflectance curve is monotonically or strictly decreasing between 420 nm to 460 nm.

23 Claims, 3 Drawing Sheets

(56) References Cited

U.S. PATENT DOCUMENTS

| | | | |
|---|---|---|---|
| 5,400,175 A | 3/1995 | Johansen et al. | |
| 5,694,240 A | 12/1997 | Sternbergh | |
| 6,102,539 A | 8/2000 | Tucker | |
| 6,132,044 A | 10/2000 | Sternbergh | |
| 6,250,758 B1 | 6/2001 | Yoshihara et al. | |
| 6,305,801 B1 | 10/2001 | Kerns et al. | |
| 6,641,261 B2* | 11/2003 | Wang | G02C 7/105 351/159.63 |
| RE38,402 E | 1/2004 | Stephens et al. | |
| 6,768,581 B1* | 7/2004 | Yip | G02B 1/115 359/212.1 |
| 6,793,339 B1 | 9/2004 | Yip et al. | |
| 6,939,899 B2 | 9/2005 | Buazza et al. | |
| 6,955,430 B2 | 10/2005 | Pratt | |
| 6,984,038 B2 | 1/2006 | Ishak | |
| 7,029,118 B2 | 4/2006 | Ishak | |
| 7,055,954 B2 | 6/2006 | Marechal | |
| 7,066,596 B2 | 6/2006 | Ishak | |
| 7,255,435 B2 | 8/2007 | Pratt | |
| 7,520,608 B2 | 4/2009 | Ishak et al. | |
| 7,556,376 B2 | 7/2009 | Ishak et al. | |
| 8,262,948 B2 | 9/2012 | Laredo et al. | |
| 8,360,574 B2 | 1/2013 | Ishak et al. | |
| 8,403,478 B2 | 3/2013 | Ishak | |
| 8,469,512 B2 | 6/2013 | Croft et al. | |
| 8,500,274 B2 | 8/2013 | Ishak | |
| 8,534,833 B2 | 9/2013 | Cado et al. | |
| 8,690,322 B2 | 4/2014 | Cado et al. | |
| 8,733,929 B2 | 5/2014 | Chiou et al. | |
| 8,770,749 B2 | 7/2014 | McCabe et al. | |
| 8,870,374 B2 | 10/2014 | Cado et al. | |
| 8,882,267 B2 | 11/2014 | Ishak et al. | |
| 8,911,082 B2 | 12/2014 | Ambler | |
| 9,022,561 B2 | 5/2015 | Fukagawa et al. | |
| 9,057,887 B1 | 6/2015 | Parveen | |
| 9,119,710 B2 | 9/2015 | Grubbs et al. | |
| 9,134,547 B2 | 9/2015 | McCabe et al. | |
| 2002/0042653 A1 | 4/2002 | Copeland et al. | |
| 2004/0036973 A1 | 2/2004 | Iori et al. | |
| 2004/0070726 A1 | 4/2004 | Ishak | |
| 2007/0216861 A1 | 9/2007 | Ishak et al. | |
| 2008/0137030 A1 | 6/2008 | Hoffman | |
| 2010/0149483 A1 | 6/2010 | Chiavetta, III | |
| 2011/0075096 A1 | 3/2011 | Ishak et al. | |
| 2011/0157546 A1 | 6/2011 | Ishak et al. | |
| 2012/0075577 A1* | 3/2012 | Ishak | G02C 7/10 351/159.29 |
| 2013/0009059 A1 | 1/2013 | Caruso | |
| 2013/0282115 A1 | 10/2013 | Ishak | |
| 2013/0293950 A1 | 11/2013 | Wei et al. | |
| 2013/0342809 A1* | 12/2013 | Higuchi | G02B 1/12 351/159.57 |
| 2014/0055736 A1 | 2/2014 | Ishak | |
| 2014/0093661 A1 | 4/2014 | Trajkovksa et al. | |
| 2014/0324166 A1 | 10/2014 | Weeber et al. | |
| 2014/0347625 A1 | 11/2014 | Tomoda et al. | |
| 2014/0368788 A1 | 12/2014 | Cada et al. | |
| 2015/0098058 A1* | 4/2015 | De Ayguavives | G02B 1/11 351/159.61 |
| 2015/0103310 A1 | 4/2015 | De Ayguavives et al. | |
| 2015/0146166 A1 | 5/2015 | Weber et al. | |
| 2015/0160478 A1 | 6/2015 | Ishak et al. | |
| 2015/0234208 A1 | 8/2015 | De Ayguavives et al. | |
| 2017/0102489 A1* | 4/2017 | Brown | G02C 7/10 |

OTHER PUBLICATIONS

Lens Technology, www.empireoptical.com/LensTechnology, Jan. 17, 2015.

\* cited by examiner

OPHTHALMIC LENS

BACKGROUND

The present invention relates to ophthalmic lens systems and, in particular, to ophthalmic lenses that attenuate the transmission of high energy visible light.

Only a small portion of the electromagnetic spectrum is of concern to the human eye. This portion of the spectrum lies in a range of wavelengths from about 100 nm to about 700 nm, and can be divided into several discrete groupings—ultraviolet (UV) light, high energy visible (HEV) light, and low energy visible light. UV light ranges in wavelength from about 100 nm to about 400 nm, and is subdivided into 3 regions—UVC (100 nm to 280 nm), UVB (280 nm to 320 nm), and UVA (320 nm to 400 nm). HEV light ranges in wavelength from about 400 nm to about 500 nm, and generally corresponds to the blue (or blue-violet) region of the visible spectrum. The last region that is of consequence to the human eye is low energy visible light, which ranges in wavelength from about 500 nm to about 700 nm.

It is widely known that UV light is harmful to the eye. UVC is completely blocked by the ozone layer, which also blocks most of UVB. Consequently, about 95% of the UV light from the sun consists of UVA. There is also a growing body of research indicating that HEV light from 400 nm to 500 nm can cause damage to the eye and in particular the retina. Although the lens and cornea of the human eye blocks UVB and most of UVA, virtually all of the HEV light can penetrate the lens and impact the retina at the back of the eye.

HEV light affects the eye in multiple ways. HEV light has been implicated in Age related Macular Degeneration (AMD), which is the leading cause of progressive blindness in seniors. One of the causes of AMD appears to be damage to the retinal pigment epithelium (RPE), a layer of light sensitive cells that lie behind the photoreceptors in the retina which are responsible for vision. Although the exact pathology of AMD is not completely understood, there is growing evidence that the exposure to HEV light may play an important role in damaging RPE cells and the development of AMD.

HEV light is also thought to contribute to eyestrain and to reduced visual acuity under certain conditions. The short, high energy wavelengths associated with HEV light may cause blue light to flicker and create glare more easily than longer, lower energy wavelengths. As a result, prolonged exposure to HEV light (e.g., from computer screens and energy efficient lighting) may cause eyestrain, headaches, physical and mental fatigue. In addition, the axial (longitudinal) chromatic aberration of light through the crystalline lens of the eye can create a "blue light blur". FIG. 1 shows light of different wavelengths 4, 5, 6 passing through the lens 3 of an eye 2. The different wavelengths are refracted differently and focus at different distances from the lens. Blue light refracts more than the other wavelengths, resulting in a focal point 7 of blue light in front of and not on the retina 8. This effect may be observed as a blue haze around objects in bright light (e.g., sun and snow), and also in foggy conditions where blue light is strongly reflected. In addition, fluorescent lamps and LED lighting (e.g., automobile headlights) have significant output of HEV light and can similarly contribute to a loss of visual acuity, especially at night while driving. Thus, the growing ubiquity of blue light from computer displays and other electronic devices, modern lighting, and other sources makes the management of HEV light a matter of growing importance.

Notwithstanding the problems associated with HEV light, visible light between about 460 nm to about 500 nm is a regulator of the circadian response in humans. Therefore, it would be desirable to reduce exposure to HEV light and, in particular, reduce eyestrain and blue light blur, without significantly affecting transmission of light in the range from about 460 nm to about 500 nm so as to not inhibit the natural function of the circadian cycle.

SUMMARY

A thin film coating for an ophthalmic lens is disclosed that a comprises alternating layers of high and low index materials. In one embodiment, the thin film coating attenuates the transmission of light and has a spectral reflectance curve comprising a reflectance of at least about 90% in a range from about 320 nm to about 420 nm, between about 45% to about 55% at about 440 nm, and about 20% or less in a range from about 460 nm to about 700 nm, and wherein the spectral reflectance curve is monotonically decreasing between about 420 nm to about 460 nm. In further embodiment, the thin film coating is applied to the front surface of an optical lens.

In yet another embodiment, the thin film coating has a spectral reflectance curve that comprises first and second regions. The first region comprises a reflectance of at least about 90% in the range of wavelength from about 320 nm to about 420 nm, a reflectance between about 45% to about 55% at a wavelength of about 440 nm, and a reflectance of about 5% or less at a wavelength of about 460 nm, and wherein the spectral reflectance curve is monotonically decreasing between about 420 nm to about 460 nm. The second region comprises a peak of reflectance between about 5% to about 15% at a wavelength of about 490 nm. In a preferred embodiment, the peak of reflectance in the second region has a full width at half maximum of about 55 nm.

BRIEF DESCRIPTION OF THE FIGURES

The embodiments described herein and other features, advantages, and disclosures contained herein, and the manner of attaining them, will be better understood from the following description in conjunction with the accompanying drawing figures, in which like reference numerals identify like elements, and wherein.

DETAILED DESCRIPTION

In the following detailed description of embodiments of the present disclosure, reference is made to the accompanying drawings that form a part hereof, and in which is shown by way of illustration, and not by way of limitation, such specific embodiments. It is to be understood that other embodiments may be utilized and that changes may be made without departing from the spirit and scope of the present disclosure.

Figure 1:
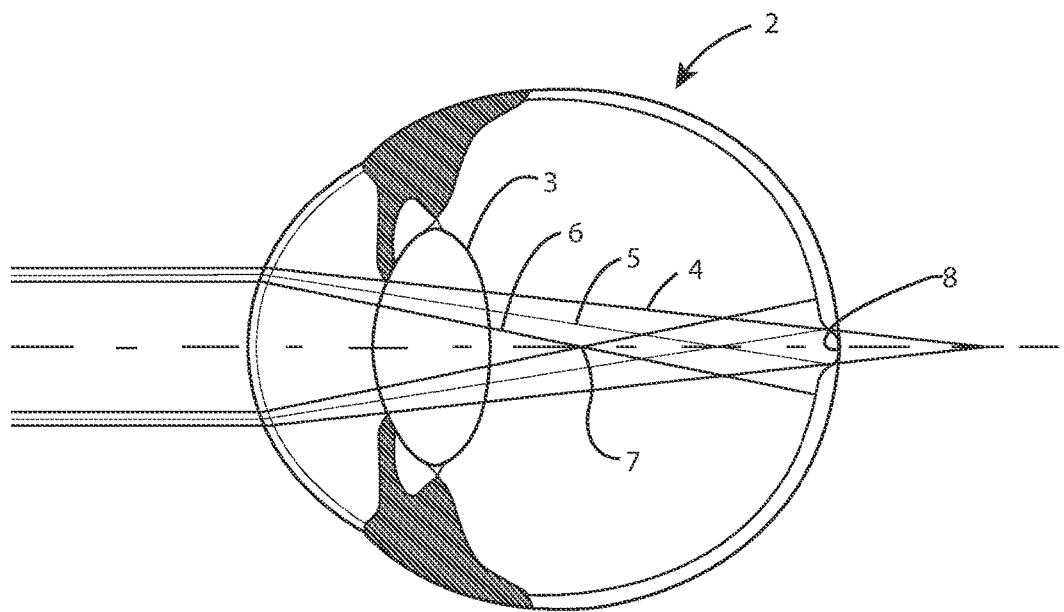
FIG. 1 is a vertical section view of an eye, showing the refraction of different wavelengths of light.
Figure 2:
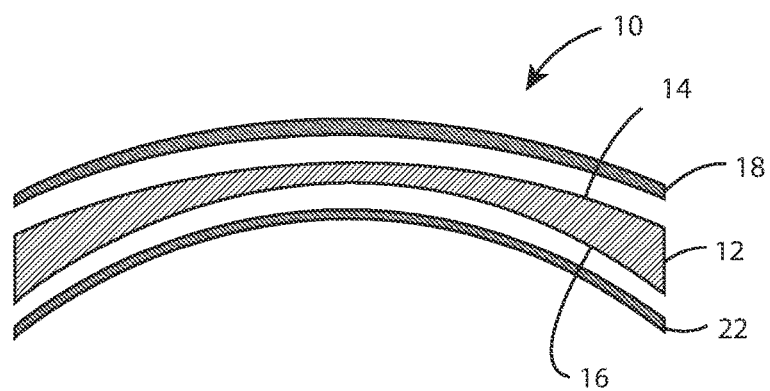
FIG. 2 is an exploded section view of an ophthalmic lens system.

Reference is now made to FIG. 2, which illustrates an ophthalmic lens system 10, that comprises an optical lens 12 having a (object side) front surface 14 and a (eye side) back surface 16. Optical lenses used in ophthalmic systems are typically produced with a convex front surface 14 and concave back surface 16. A thin film coating 18 that attenuates transmission of HEV light is applied to front surface 14. An optional anti-reflective thin film coating 22 may be applied to back surface 16.

It has been found that the attenuation of HEV light in a range of wavelengths centered at about 440 nm reduces the problem of glare and blue blur caused by HEV light, without significantly affecting the portion of the spectrum that is important for the circadian response. In one embodiment, thin film coating 18 attenuates light in a range of about 420 nm to about 460 nm, which reduces the transmission of HEV light while avoiding significant interference with the circadian response. In a further embodiment, the transmission of light is attenuated by at least about 90% at about 420 nm and decreases to about 5% or less at about 460 nm. Within this range, the transmission of light is preferably attenuated between about 45% to about 55% at a wavelength of about 440 nm, and more preferably by about 50% at a wavelength of about 440 nm.

It is desirable that the attenuation of light decreases rapidly above about 440 nm, to minimize interference with the circadian response after blocking unwanted HEV and UV wavelengths. Thus, in a preferred embodiment, the attenuation of HEV light between about 420 nm and about 460 nm has a curve that is monotonically decreasing—i.e. is either decreasing or nonincreasing over the range from 420 nm to 460 nm. More preferably, the attenuation of HEV light between about 420 nm and about 460 nm has a curve that is strictly decreasing—i.e. is continuously decreasing without a plateau. In a particularly preferred embodiment, the attenuation of light comprises a spectral reflectance curve that is strictly decreasing between about 420 nm and about 460 nm, and has a slope of about −0.70 at about 440 nm.

Thin film coating 18 may also assist in blocking transmission of UV light by attenuating light in a range of wavelengths less than about 420 nm. In one embodiment, thin film coating 18 may further attenuate light by about 90% or more in a region from about 320 nm to about 420 nm. The attenuation of visible light above about 460 nm is ideally minimized. In a further embodiment, the attenuation of light in a range of about 460 nm to about 700 nm is attenuated by about 20% or less, and more preferably by about 15% or less.

Thin film coatings that are designed to attenuate light below about 460 nm may give the ophthalmic lens system an undesirable purple or dark blue reflection. It has been found that this effect may be reduced by the attenuation of transmitted light in a secondary region that comprises a peak of attenuation between about 5 to 15%, at a wavelength between about 480 nm to about 490 nm. In one embodiment, the secondary region comprises a peak of attenuation between about 5% to about 15%, at about 490 nm, with a full width at half maximum (FWHM) of about 55 nm. In a preferred embodiment, the secondary region has a peak of attenuation of about 12%. Less than 5% attenuation does not significantly reduce the purple or dark blue reflectance.

Thin film coating 18 comprises multiple layers of alternating high and low index materials, such as metal oxides, metal fluorides and other materials known in the art. High index materials have an index of refraction greater than about 1.90, and include, but are not limited to: $TiO_2$, $ZrO_2$, $HfO_2$, and commercially available materials such as Dralo (Umicore Thin Film Products—Providence, R.I.). The low index materials have an index of refraction of less than about 1.8 and include but are not limited to: $SiO_2$, $MgF_2$, $Al_2O_3$. In a preferred embodiment, the low index material has an index of refraction of about 1.50 or less. Other fluorides and carbides are known in the art to have suitable refractive indices for use in thin film coating 18, such as $CeF_3$, cryolite ($Na_3AlF_6$), and AlF.

The number of layers and the thickness of the high and low index materials in each layer determine the characteristics of the attenuation of transmission of light and spectral reflectance curve of the thin film coating. In one embodiment, thin film coating 18 comprises at least eight layers of alternating high and low index materials, and preferably comprises ten layers. In a particularly preferred embodiment, thin film coating comprises ten layers of alternating high and low index materials, and most preferably ten layers of alternating $TiO_2$ and $SiO_2$. Although more than ten alternating layers are possible, the benefits provided by the additional layers may be outweighed by the increased manufacturing time.

The layers of alternating high and low index materials that comprise thin film coating 18 may be applied to the front surface 14 of the substrate optical lens 12 by various methods known in the art, including chemical vapor deposition, and physical vapor deposition such as sputtering and electron beam evaporation. In one embodiment, high index layers of $TiO_2$ may be applied by vapor deposition of a $Ti_3O_5$ starting material, as is known in the art.

Optical lens 12 may be formed of a variety of different plastic materials that are known in the art. In one embodiment, the lens material is a high refractive index material such as a urethane-based polymer. In a preferred embodiment, the lens material does not significantly attenuate the transmission of light. Conventional UV/blue blocking lenses involve dyes that can give the lens an undesirable yellowish to red tint. These conventional lenses may also generally reduce the transmission of light across a large portion of the visible spectrum, thereby reducing their effectiveness to daytime wear only. In contrast, the attenuation and light transmission curve of the ophthalmic lens system may be substantially determined by thin film coating 18, which allows optical lens 12 to be colorless. By eliminating the need for the dyes, the color acuity and total amount of light entering the eye are improved.

Nonetheless, optical lens 12 may contain in-mass dyes or other additives. In one embodiment, optical lens 12 may contain a dye or pigment that gives the lens an aesthetically desirable tint or coloring. In another embodiment, optical lens 12 may contain an in-mass, UV absorbing additive that supplements the UV blocking properties of thin film coating 18. UV/blue absorbing dyes and additives are commercially available, and include BPI Melanin Therapeutic Tint, Diamond Dye 550, UV Blue Filter Vision 450 (Brain Power Inc.—Miami, Fla.), and C200-95 Opti-Safe Lens Dye (Phantom Research Laboratories Inc.—Miami, Fla.). Other UV absorbing additives known in the art include polyamides, benzophenones, hydroxybenzophenone, hydroxyphenylbenzotriazole, benzotriazoles, hydroxyphenyltriazines, 2-(2-hydroxyphenyl)-benzotriazoles, 2-hydroxybenzophenones, hydroxyphenyl-s-triazines, and oxalanilides. In a preferred embodiment, the UV absorbing additive attenuates the transmission of light by at least about 95% in a wavelength range from about 280 nm to about 400 nm and more preferably, attenuates transmission by at least 99% in a range from about 320 nm to about 400 nm. The addition of a UV absorbing additive may give optical lens 12 a pronounced yellow to red tint.

Ophthalmic lens system 10 optionally includes, but does not require an anti-reflective coating 22 applied to back surface 16 of optical lens 12. Anti-reflective coating 22 reduces the unwanted reflection of UV and HEV light from back surface 16 back toward the wearer's eye. In one embodiment, anti-reflective coating 22 has a transmission of at least about 99.25% in the range of wavelengths from about 280 nm to about 700 nm. In a preferred embodiment, anti-reflective coating 22 reflects less than about 1.5% of light in a range from about 300 nm to about 460 nm. Such anti-reflective coatings and methods of applying them to optical lenses are well known in the art.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

Example 1

A thin film coating comprising ten layers of alternating high index ($TiO_2$) and low index ($SiO_2$) materials was developed as shown in Table 1. Layer 1 represents the layer positioned closest to optical lens 12, with $TiO_2$ being the first, innermost material in the thin film coating. Layer 10 represents the layer positioned farthest from optical lens 12, with $SiO_2$ being the last, outermost material in the thin film coating. The thickness of the materials in each layer is shown in Table 1.

TABLE 1

Example 1, Thin Film Coating Composition

| Layer | Material | Thickness (nm) |
|---|---|---|
| 10 | $SiO_2$ | 144.763 |
| 9 | $TiO_2$ | 37.592 |
| 8 | $SiO_2$ | 52.338 |
| 7 | $TiO_2$ | 37.006 |
| 6 | $SiO_2$ | 61.246 |
| 5 | $TiO_2$ | 33.492 |
| 4 | $SiO_2$ | 60.671 |
| 3 | $TiO_2$ | 39.996 |
| 2 | $SiO_2$ | 59.378 |
| 1 | $TiO_2$ | 25.230 |

Figure 3:
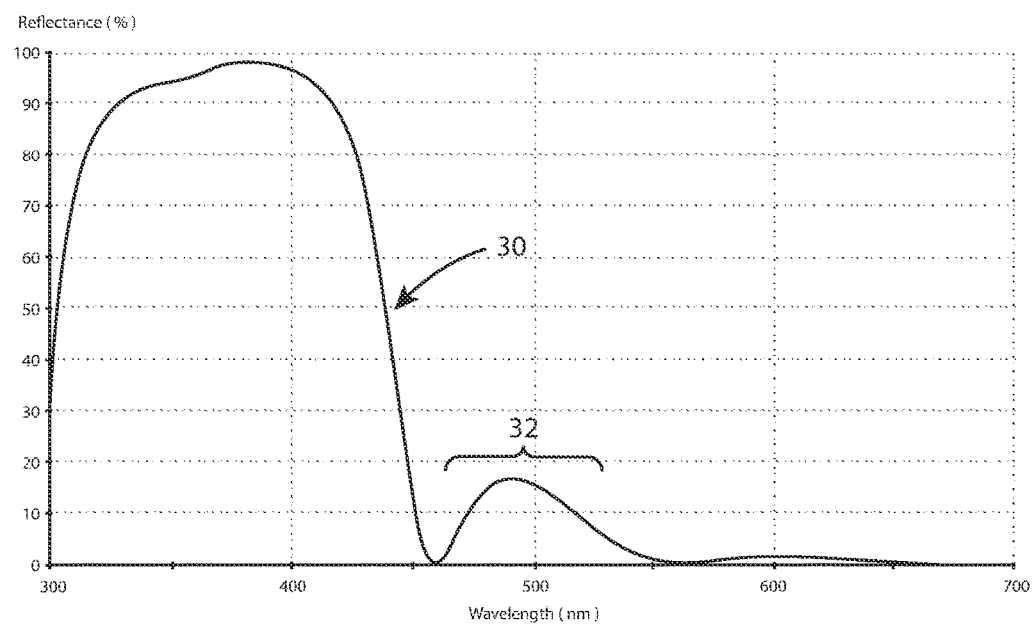
FIG. 3 is a data plot of the reflectance and wavelength of an ophthalmic lens system.

The spectral reflectance curve of the thin film coating at wavelengths ranging from 300 nm to 700 nm is shown in FIG. 3. The attenuation of transmission is characterized by a primary reflection region having a spectral reflectance curve 30 with about 50% reflectance at about 440 nm and a slope of about m=−0.7. Reflectance is at least about 90% from about 320 nm to about 420 nm, at least about 95% at about 400 nm, is strictly decreasing from about 90% at 420 nm to about 5% or less at 460 nm, and is about 20% or less from about 460 nm to about 700 nm. A secondary reflection region 32 is present having a peak of reflectance of about 15% at about 490 nm, with an FWHM of about 55. Reflectance decreases on either side of the peak to about 2% or less at 460 nm and 540 nm. The secondary reflection region reduces the purple or dark blue reflection discussed above and provides some attenuation of HEV light in the range of about 480 nm to about 490 nm, while providing sufficient transmission of light above 460 nm to avoid impairment of the circadian response.

As shown in FIG. 3, attenuation of transmission decreases at wavelengths less than about 320 nm. As discussed above, the UV blocking characteristics of ophthalmic lens system 10 may be supplemented by adding an in-mass UV absorbing additive to optical lens 12, such that attenuation of transmission is at least about 95% from about 320 nm to about 400 nm.

Example 2

A thin film coating comprising ten layers of alternating high index ($TiO_2$) and low index ($SiO_2$) materials was developed as described in Example 1, except that the thickness of the materials in each layer was as shown in Table 2.

TABLE 2

Example 2, Thin Film Coating Composition

| Layer | Material | Thickness (nm) |
|---|---|---|
| 10 | $SiO_2$ | 144.402 |
| 9 | $TiO_2$ | 37.567 |
| 8 | $SiO_2$ | 50.631 |
| 7 | $TiO_2$ | 37.296 |
| 6 | $SiO_2$ | 63.374 |
| 5 | $TiO_2$ | 33.333 |
| 4 | $SiO_2$ | 61.332 |
| 3 | $TiO_2$ | 39.166 |
| 2 | $SiO_2$ | 59.017 |
| 1 | $TiO_2$ | 23.452 |

Figure 4:
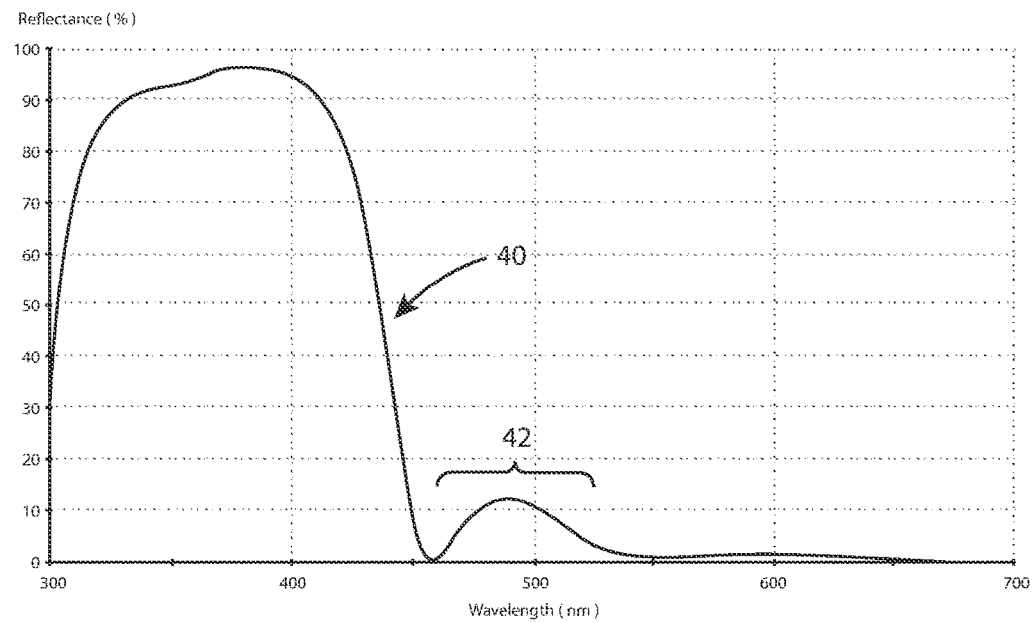
FIG. 4 is a data plot of the reflectance and wavelength of an alternative embodiment of an ophthalmic lens system.

The spectral reflectance curve of the thin film coating at wavelengths ranging from 300 nm to 700 nm is shown in FIG. 4. The attenuation of transmission is characterized by a primary reflection region similar to the thin film coating of Example 1, and having a spectral reflectance curve 40 with about 50% reflectance at about 440 nm and a slope of about m=−0.65. A secondary reflection region 42 is present having a peak of reflectance of about 10% at about 490 nm, with an FWHM of about 53. Reflectance decreases on either side of the peak to a reflectance of about 2% or less at 460 nm and 540 nm.

Example 3

A thin film coating comprising ten layers of alternating high index ($TiO_2$) and low index ($SiO_2$) materials was developed as described in Example 1, except that the thickness of the materials in each layer was as shown in Table 3.

TABLE 3

Example 3, Thin Film Coating Composition

| Layer | Material | Thickness (nm) |
|---|---|---|
| 10 | $SiO_2$ | 141.462 |
| 9 | $TiO_2$ | 37.806 |
| 8 | $SiO_2$ | 50.204 |
| 7 | $TiO_2$ | 37.324 |
| 6 | $SiO_2$ | 66.067 |
| 5 | $TiO_2$ | 33.582 |
| 4 | $SiO_2$ | 61.666 |

TABLE 3-continued

Example 3, Thin Film Coating Composition

| Layer | Material | Thickness (nm) |
|---|---|---|
| 3 | $TiO_2$ | 36.906 |
| 2 | $SiO_2$ | 58.956 |
| 1 | $TiO_2$ | 21.624 |

Figure 5:
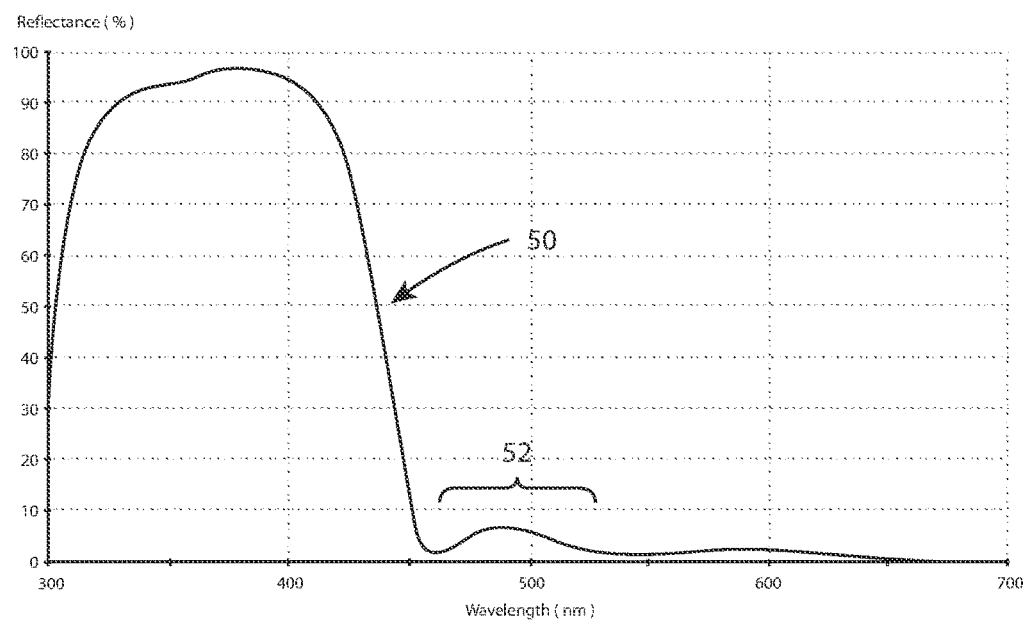
FIG. 5 is a data plot of the reflectance and wavelength of another embodiment of an ophthalmic lens system.

The spectral reflectance curve of the thin film coating at wavelengths ranging from 300 nm to 700 nm is shown in FIG. 5. The attenuation of transmission is characterized by a primary reflection region similar to the thin film coating of Example 1, and having a spectral reflectance curve 50 with about 50% reflectance at about 440 nm and a slope of about m=−0.62. A secondary reflection region 52 is present having a peak attenuation of about 5% at about 490 nm, with an FWHM of about 56. Reflectance decreases on either side of the peak to about 2% or less at 460 nm and 540 nm.

Example 4

It is also possible to develop thin film coatings having characteristics that resemble the attenuation of transmission in conventional UV/blue blocking lenses, without the need for in-mass dyes or pigments. A thin film coating comprising ten layers of alternating high index ($TiO_2$) and low index ($SiO_2$) materials was developed as described in Example 1, except that the thickness of the materials in each layer was as shown in Table 4.

TABLE 4

Example 4, Thin Film Coating Composition

| Layer | Material | Thickness (nm) |
|---|---|---|
| 10 | $SiO_2$ | 153.449 |
| 9 | $TiO_2$ | 39.878 |
| 8 | $SiO_2$ | 55.478 |
| 7 | $TiO_2$ | 39.227 |
| 6 | $SiO_2$ | 64.921 |
| 5 | $TiO_2$ | 35.501 |
| 4 | $SiO_2$ | 64.311 |
| 3 | $TiO_2$ | 42.396 |
| 2 | $SiO_2$ | 62.941 |
| 1 | $TiO_2$ | 26.743 |

Figure 6:
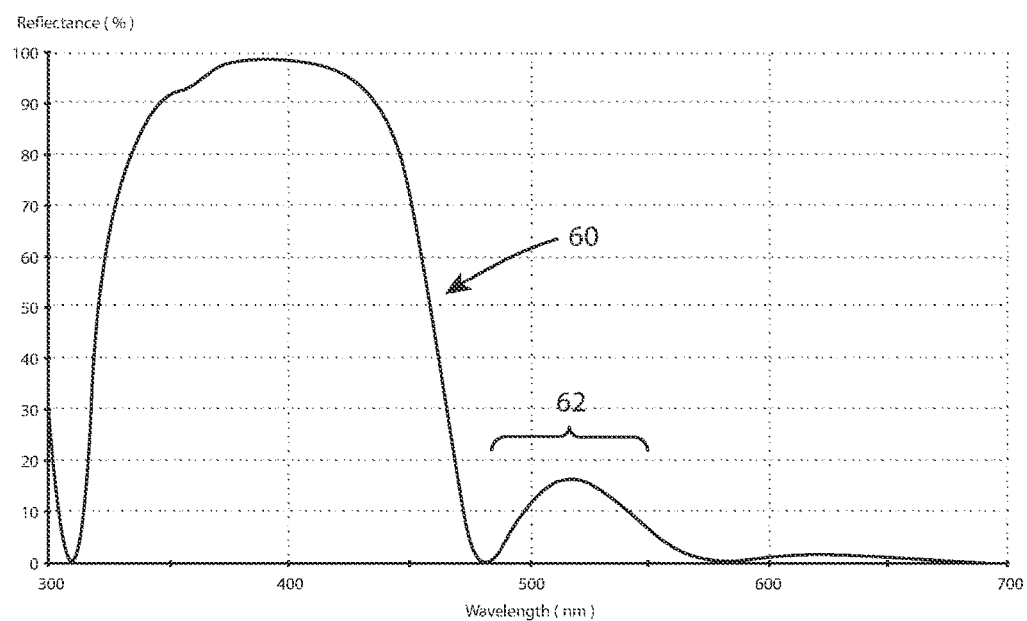
FIG. 6 is a data plot of the reflectance and wavelength of yet another embodiment of an ophthalmic lens system.

The spectral reflectance curve of the thin film coating at wavelengths ranging from 300 nm to 700 nm is shown in FIG. 6. The attenuation of transmission is characterized by a primary reflection region similar to the thin film coating of Example 1, except shifted toward higher wavelengths—i.e. having a spectral reflectance curve 60 with about 50% reflectance at about 460 nm and a slope of about m=−0.70. Reflectance is at least about 90% from about 340 nm to about 440 nm, at least about 95% at about 420 nm, is strictly decreasing from about 90% at 440 nm to about 5% or less at 480 nm, and is about 20% or less from about 480 nm to about 700 nm. A secondary reflection region 62 is present having a peak of reflectance of about 15% at about 510 nm, with an FWHM of about 56. Reflectance decreases on either side of the peak to about 2% or less at 480 nm and 560 nm. Thus, the primary reflection region attenuates transmission of a wider range of HEV light, but overlaps significantly with the range of from about 460 nm to about 500 nm which is believed to be important for the circadian response.

The ophthalmic lens system 10 in accordance with the embodiments described herein provides attenuation of damaging and fatigue-inducing UV and HEV light. The thin film coating 18 particularly minimizes transmission of the portions of HEV light that cause glare and blue light blur such that visual acuity is improved in viewing computer and electronic device displays, and under modern lighting conditions such as fluorescent and LED lamps. Meanwhile, the ophthalmic lens system 10 allow significant transmission of light in the wavelength range associated with the circadian cycle of the body to reach the eye.

Although thin film coating 18 is described as applied to the front surface of an ophthalmic lens system 10, those of skill in the art will appreciate that thin film coating 18 may also be applied to the back surface of an ophthalmic lens system. In addition, other types of coatings known in the art may be incorporated into thin film coating 18. For example, thin film coating 18 may also incorporate an anti-static coating, a scratch resistant coating, a hydrophobic/oleophobic coating and/or an anti-reflective coating as are known in the art.

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

What is claimed is:

1. An ophthalmic lens, comprising:
   an optical lens having a front surface and a back surface;
   a thin film coating on the front surface comprising alternating layers of high and low index materials, the coating attenuating transmission of light and having a spectral reflectance curve comprising a reflectance of at least 80% from 320 nm to 420 nm, between 40% to 60% at 440 nm, and 20% or less from 480 nm to 700 nm, and wherein the spectral reflectance curve is monotonically decreasing between 420 nm to 450 nm.

2. The ophthalmic lens of claim 1, wherein the spectral reflectance curve further comprises a peak of reflectance between 5% to 15% at a wavelength of between 480 nm and 500 nm.

3. The ophthalmic lens of claim 1, wherein the spectral reflectance curve is strictly decreasing between 420 nm to 460 nm.

4. The ophthalmic lens of claim 1, wherein the reflectance is between 45% to 55% at 440 nm.

5. The ophthalmic lens of claim 1, wherein the spectral reflectance curve has a slope of between −0.62 to −0.70 at 440 nm.

6. The ophthalmic lens of claim 1, wherein the high index materials have an index of refraction of at least 1.90 and the low index materials have an index of refraction of 1.80 or less.

7. The ophthalmic lens of claim 6, wherein the low index materials have an index of refraction of about 1.50 or less.

8. The ophthalmic lens of claim 6, wherein the high index materials are selected from the group consisting of: $TiO_2$, $ZrO_2$, and $HfO_2$.

9. The ophthalmic lens of claim 8, wherein the low index materials are selected from the group consisting of: $SiO_2$, $MgF_2$, and $Al_2O_3$.

10. The ophthalmic lens of claim 7, wherein the thin film coating comprises alternating layers of $TiO_2$ and $SiO_2$.

11. The ophthalmic lens of claim 1, wherein the optical lens comprises an in-mass UV light absorbing additive that attenuates the transmission of light by at least 95% in a range from 280 nm to 400 nm.

12. The ophthalmic lens of claim 1, wherein the optical lens comprises an in-mass UV light absorbing additive that attenuates the transmission of light by at least 99% in a range from 320 nm to 400 nm.

13. The ophthalmic lens of claim 1, further comprising an anti-reflective coating on the back surface of the optical lens.

14. The ophthalmic lens of claim 1, wherein the spectral reflectance curve comprises a reflectance of at least 90% from 320 nm to 420 nm, between 45% to 55% at 440 nm, and 20% or less from 460 nm to 700 nm, and wherein the spectral reflectance curve is monotonically decreasing between 420 nm to 460 nm.

15. The ophthalmic lens of claim 13, wherein the anti-reflective coating reflects less than 1.5% of light in a range from 300 nm to 460 nm.

16. The ophthalmic lens of claim 1, wherein the optical lens is colorless.

17. A thin film coating for an ophthalmic lens, comprising layers of alternating high and low index materials, the thin film coating attenuating the transmission of light and having a spectral reflectance curve comprising:
a first region comprising a reflectance of at least 80% from 320 nm to 420 nm, a reflectance between 40% to 60% at a wavelength of 440 nm, and a reflectance of 10% or less at a wavelength of 460 nm, and wherein the spectral reflectance curve is monotonically decreasing between 420 nm to 450 nm; and
a second region comprising a peak of reflectance between 5% to 15% at a wavelength of between 480 nm to 500 nm.

18. The thin film coating of claim 17, wherein the peak of reflectance in the second region has a full width at half maximum of between 50 nm to 60 nm.

19. The thin film coating of claim 17, wherein the spectral reflectance curve is strictly decreasing between 420 nm to 460 nm.

20. The thin film coating of claim 17, wherein the reflectance is between 45% to 55% at 440 nm.

21. The thin film coating of claim 17, wherein the spectral reflectance curve has a slope of between −0.62 to −0.70 at 440 nm.

22. A thin film coating for an ophthalmic lens, comprising layers of alternating high and low index materials, the thin film coating attenuating the transmission of light and having a spectral reflectance curve comprising:
a first region comprising a reflectance of at least 80% from 320 nm to 420 nm, between 40% and 60% at 440 nm, and decreasing to 10% or less at 460 nm; and
a second region comprising a peak of reflectance between 5% and 15% at between 480 nm and 500 nm.

23. The thin film coating of claim 22, wherein the peak reflectance in the second region has a full width at half maximum of between 50 nm to 60 nm.

* * * * *